Sept. 20, 1960   D. SUVERKROP   2,952,962
CASTOR BEAN HARVESTER
Filed Aug. 2, 1957   7 Sheets-Sheet 1

INVENTOR,
DON SUVERKROP
BY
Lyon & Lyon
ATTORNEYS

Sept. 20, 1960     D. SUVERKROP     2,952,962
CASTOR BEAN HARVESTER

Filed Aug. 2, 1957     7 Sheets-Sheet 5

INVENTOR.
DON SUVERKROP
BY
Lyon & Lyon
ATTORNEYS

Sept. 20, 1960    D. SUVERKROP    2,952,962
CASTOR BEAN HARVESTER
Filed Aug. 2, 1957    7 Sheets-Sheet 6
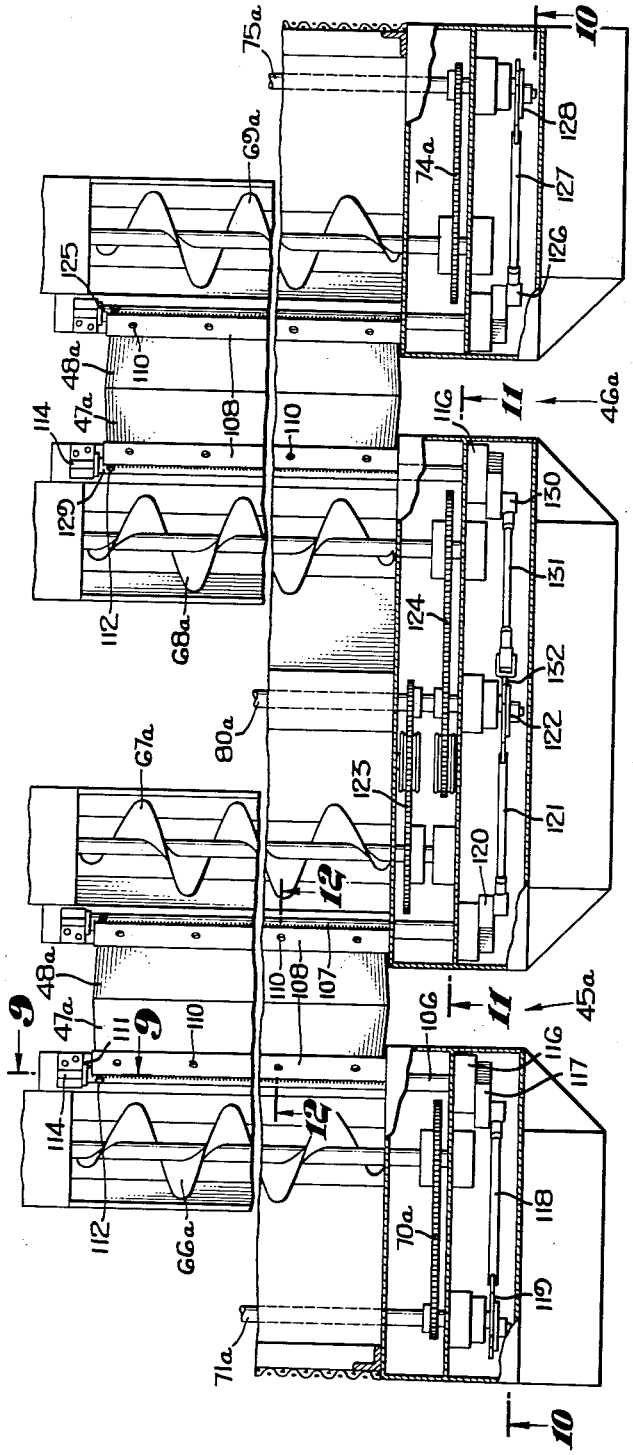
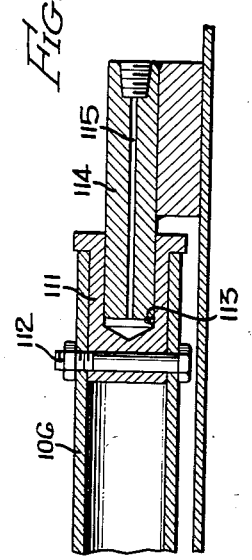
INVENTOR,
DON SUVERKROP
BY Lyon & Lyon
ATTORNEYS

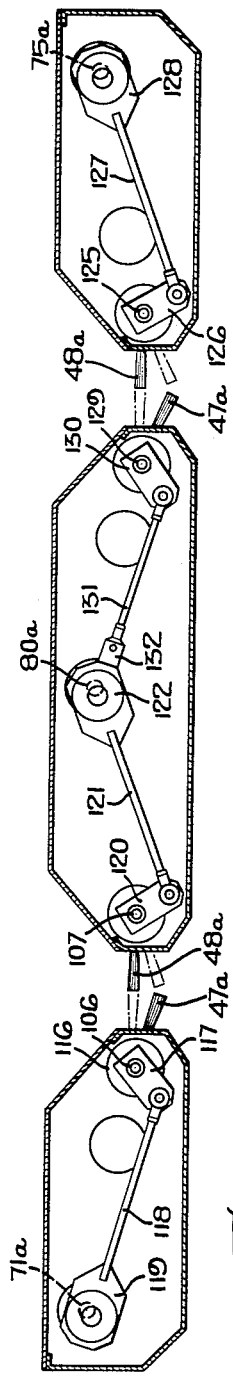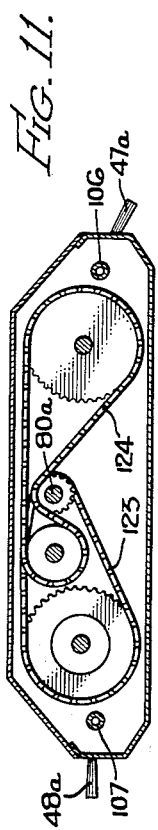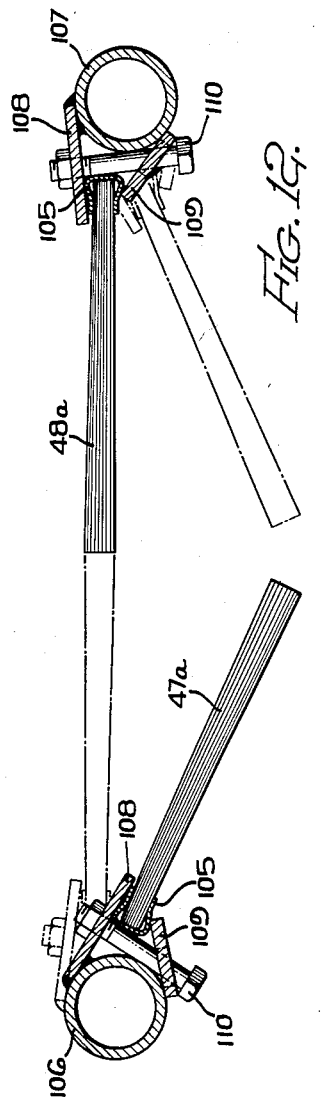

United States Patent Office 2,952,962
Patented Sept. 20, 1960

2,952,962

CASTOR BEAN HARVESTER

Don Suverkrop, Bakersfield, Calif., assignor to Hopper Machine Works, Inc., Bakersfield, Calif., a corporation of California Filed Aug. 2, 1957, Ser. No. 675,887

9 Claims. (Cl. 56—130)

This invention relates to agricultural implements and is particularly directed to improvements in a machine for harvesting castor beans. Castor bean plants are grown for the seed which contains about 50% oil. Castor oil is used extensively for its lubrication properties and is now an important article of commerce.

Commercially grown castor bean plants may reach a height of ten feet or more. The seeds grow inside pods or capsules which form clusters on spikes attached to the plant. The pod or capsule is made up of three segments, each of which contains a seed or "bean."

It is an object of this invention to provide a castor bean harvester which will move among rows in a field separating the clusters of pods from the plants and without removing the plants from the ground. Another object is to provide such a harvester employing an improved form of rotary knocker which shakes the pod clusters from the plant so that a maximum yield is obtained of pods and seed while discarding a major portion of the plants and trash. Another object is to provide a harvester device of this type having an improved form of collector cage in which plants which have passed through the cage are prevented from interfering with harvesting action on a plant still passing through the cage. Other and more detailed objects and advantages will appear hereinafter.

In the drawings:

Figure 8 is a plan view of the forward portion of the device shown in Figures 6 and 7, certain parts being broken away and certain parts being shown in section.

Figure 9 is an enlarged sectional detail taken substantially on the lines 9—9 as shown in Figure 8.

Figure 10 is a sectional elevation in diagrammatic form, taken substantially on the lines 10—10 as shown in Figure 8.

Figure 11 is a sectional detail taken substantially on the lines 11—11 as shown in Figure 8.

Figure 12 is an enlarged sectional view taken substantially on the lines 12—12 as shown in Figure 8.

Figure 1:
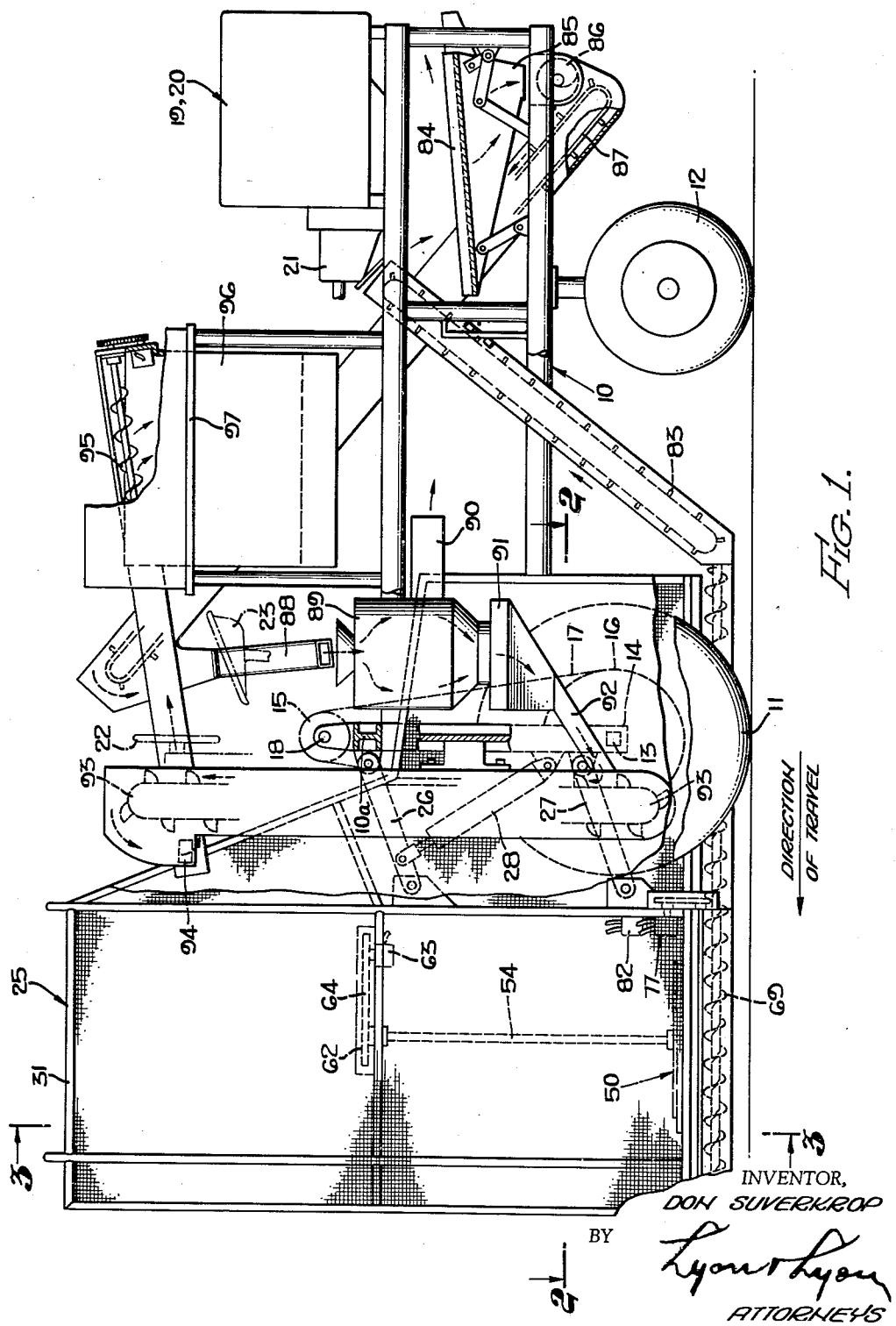
Figure 1 is a side elevation partly broken away and with parts in section, showing a preferred embodiment of this invention.

Referring to the drawings, the mobile frame 10 is supported on two large diameter driving wheels 11 and two smaller diameter steerable wheels 12. Each wheel 11 is mounted on a stub axle 13 projecting horizontally from a vertical column or strut 14 forming a part of the frame 10. Each wheel 11 is individually driven by means of sprockets 15 and 16 and connecting chain 17. It should be noted that this construction avoids the use of a continuous axle extending laterally between the wheels 11. The jack shaft 18 which carries the driving sprockets 15 extends continuously across the frame 10 at a location above the cross-member 10a. The jack shaft 18 is driven in any suitable or convenient fashion from one of a pair of internal combustion engines 19, 20 mounted on the rear portion of the frame 10. A suitable change speed transmission 21 is preferably employed to vary the ground speed of the harvester within desired limits. A steering wheel 22 is mounted on the frame at a location convenient to the operator's seat 23 and this steering wheel acts through linkage connections (not shown) to steer the rear wheels 12.

The collector cage assembly 25 is adjustably mounted on the frame 10 by means of parallel pivoted links 26 and 27 and held in adjusted position by means of the hydraulic cylinder assembly 28. The cage 25 includes parallel side walls 29 and 30. A top wall 31 and a short front wall 32 and rear walls 33, 34 and 35. Tapered walls 36 define a pair of outlet openings 37 and 38 leading from the main chamber within the cage 35. Parallel walls 39 form discharge slots 40 and 41 in the machine which are continuations of the outlet openings 37 and 38.

The bottom wall of the collector cage 25 includes a central section 42 and two side sections 43 and 44. A slot 45 is formed between the bottom sections 43 and 42 and a similar slot 46 is formed between the bottom sections 42 and 44. The spacing between the slots 45 and 46 is the same as the spacing between the rows of the castor bean plants. Pairs of opposed longitudinally extending brushes 47 and 48 are mounted in the slots 45 and 46, and as the harvester machine moves forward, the stalks of the castor bean plants 49 pass between the ends of the brushes 47 and 48, the bristles deflecting to permit them to do so.

A rotary knocker generally designated 50, is mounted within the collector cage 25 in a central position on the bottom section 42 and this knocker comprises a pair of vertically spaced circular disks 51 and 52 having a central hub 53 keyed to a vertical driving shaft 54. A plurality of centrifugally actuated knocker bars 55 are pivotally mounted on pins 56 extending between the disks 51 and 52. Each knocker bar 55 is curved at its swinging end 57 and each is provided with a motion-limiting retainer 58 which engages a cushioned post 59 extending between the disks 51 and 52.

The lower end of the drive shaft 54 is received in a bearing 60 mounted on the bottom section 42 and the upper end of the shaft is mounted in a bearing 61. A sprocket 62 fixed on the upper end of the shaft 54 is driven from a hydraulic motor 63 through a chain drive 64. The hydraulic motor receives oil under pressure from a hydraulic pump (not shown) driven by one of the internal combustion engines 19, 20.

Figure 2:
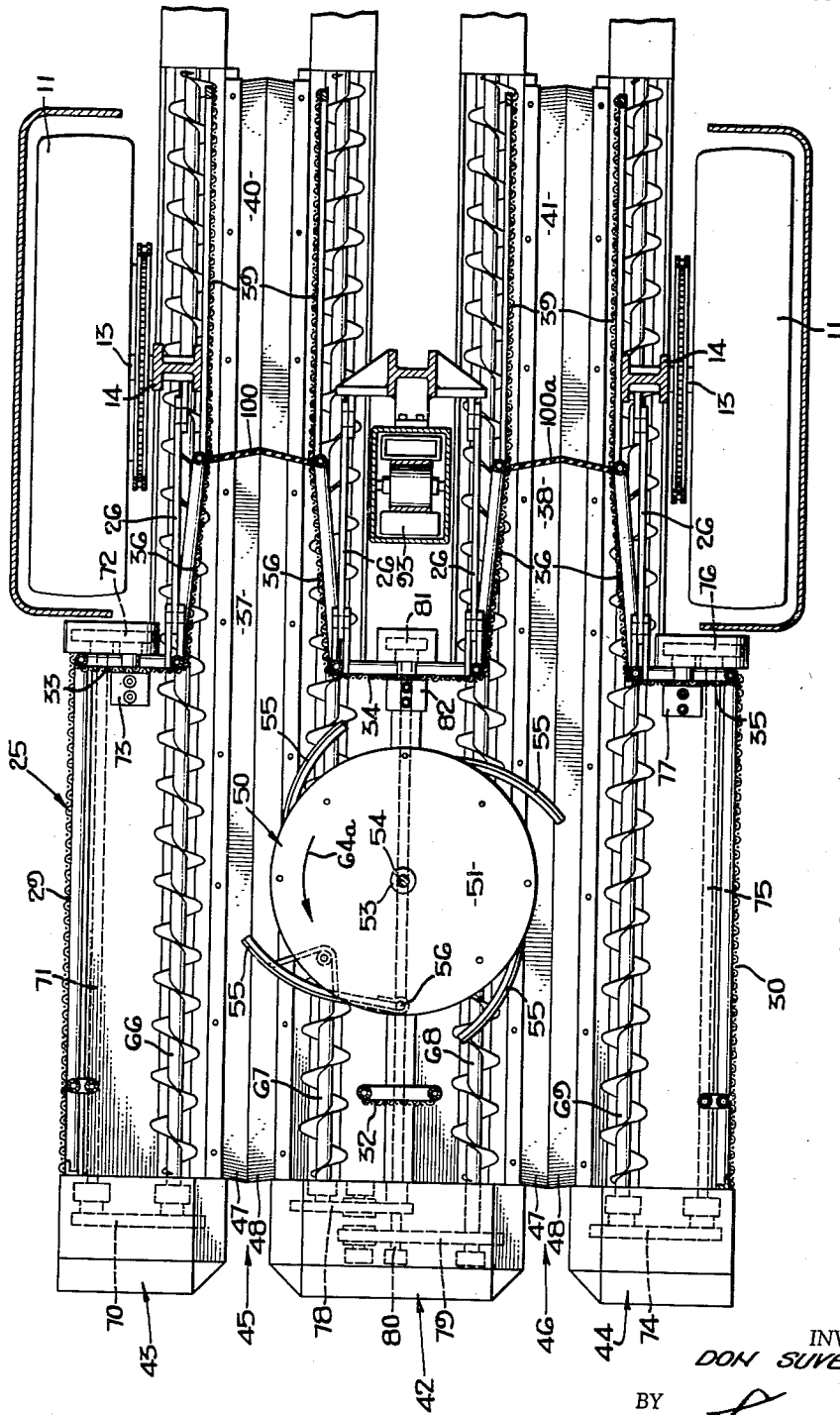
Figure 2 is an enlarged partial sectional, partial plan view of the forward portion of the apparatus taken substantially on the lines 2—2 as shown in Figure 1.
Figure 3:
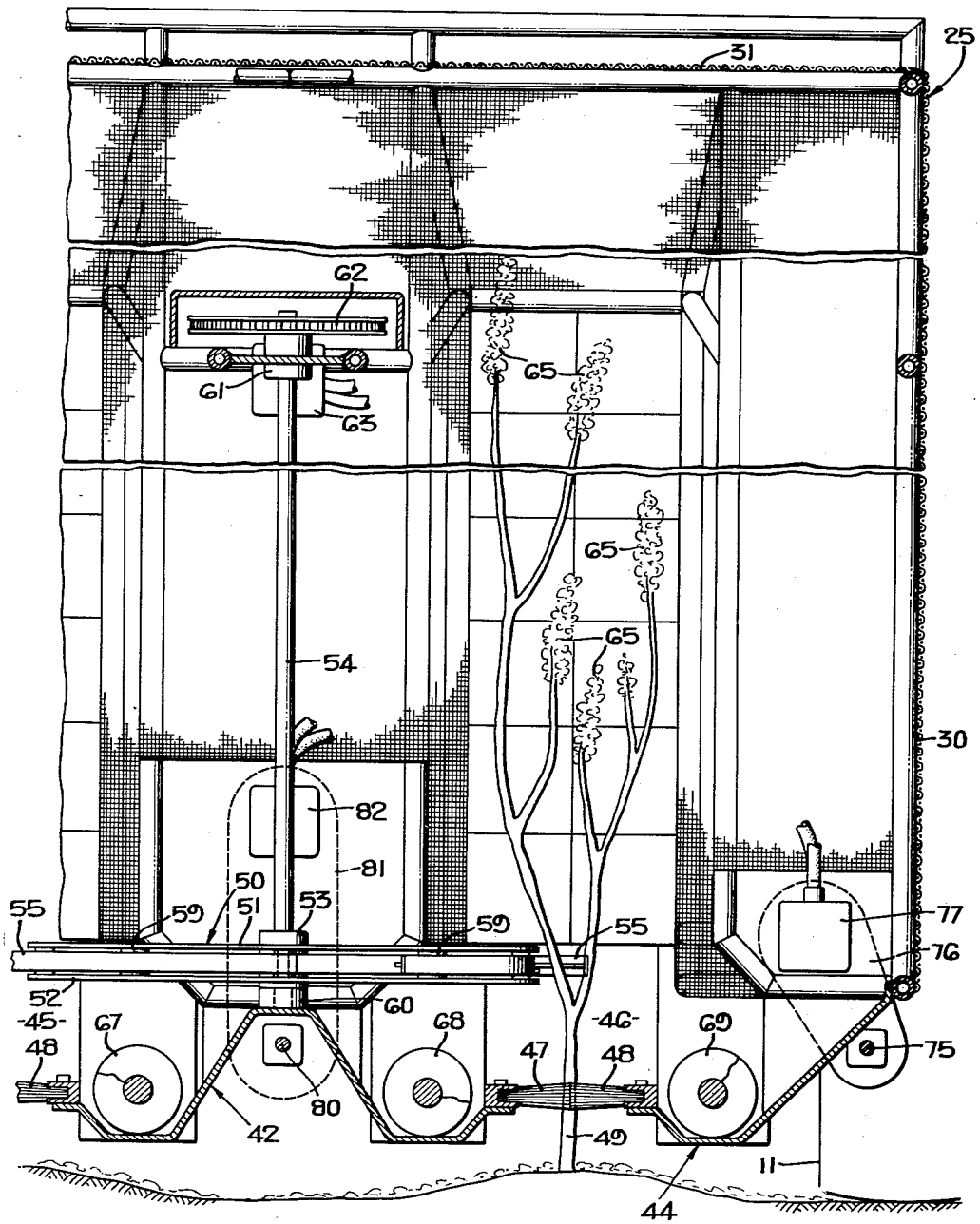
Figure 3 is an enlarged transverse sectional view of the device taken substantially on the lines 3—3 as shown in Figure 1.
Figure 4:
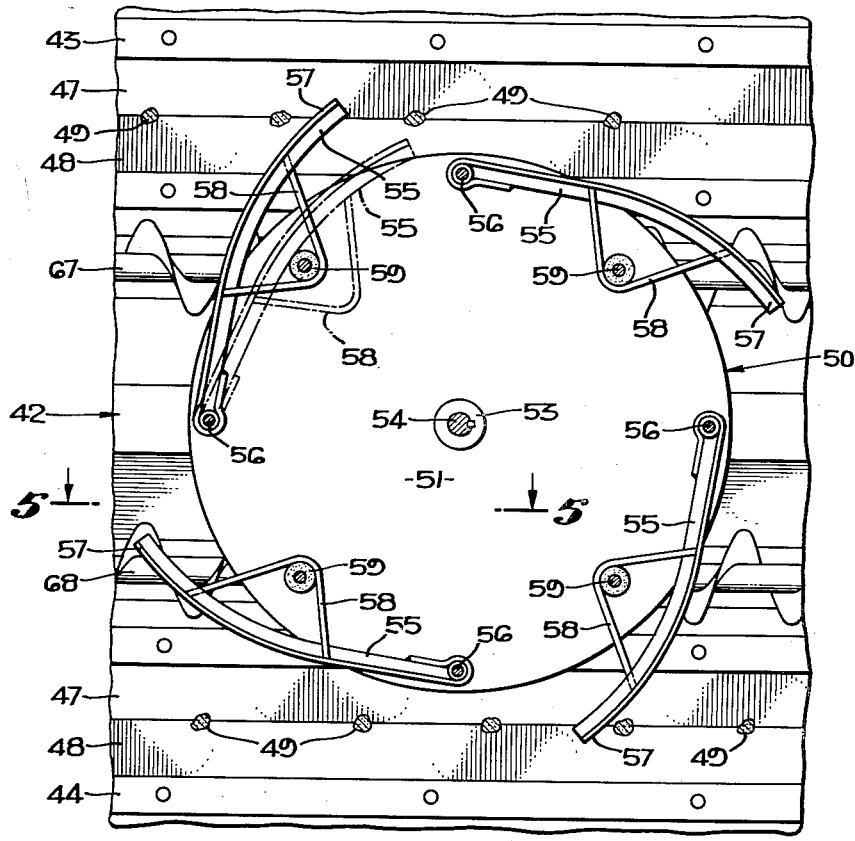
Figure 4 is an enlarged plan view, partly broken away and partially in section, showing construction of the rotary knocker.
Figure 5:
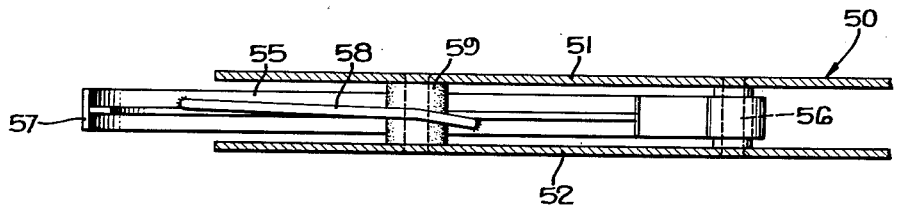
Figure 5 is an enlarged sectional detail taken substantially on the lines 5—5 as shown in Figure 4.

When the vertical drive shaft 54 is rotated under power, the rotary knocker 50 turns in the direction of the arrow 64a as shown in Figure 2 with the result that the knocker bars 55 swing outward under centrifugal force and engage the stalks of the castor bean plants 49 as they pass through the slots 45 and 46, thereby causing the clusters of pods 65 to fall from the plants into the interior of the cage 25.

Longitudinally extending screw conveyors are mounted on the collector cage 25 on each side of the slots 45 and 46. As shown in the drawings, each of these conveyors include a rotary screw 66, 67, 68 and 69 mounted to turn on one of the bottom sections 42, 43, and 44. Each conveyor screw is mounted in a shallow depression or channel and positioned adjacent one of the slot-closing brushes 47, 48. Each conveyor screw is driven from its forward end. Thus conveyor screw 66 is driven by chain and sprocket connection 70, shaft 71, gearing 72 and hydraulic motor 73. Similarly, conveyor screw 69 on the bottom section 44 is driven through chain and sprocket connection 74, shaft 75, gearing 76 and hydraulic motor 77. The two conveyor screws 67 and 8 on opposite sides of the bottom section 42 are driven by chain and sprocket connection 78 and 79 on the central drive shaft 80. This shaft in turn is driven through chain and sprocket connection 81 from the hydraulic motor 82. The hydraulic motor 63, 73, 77 and 82 may each be driven from the same hydraulic pump with valves (not shown) for individual speed control.

The conveyor screws 66, 67, 68 and 69 serve to transport the capsules or pods shaken from the plants rearwardly of the collector cage 25 and into the drag flight conveyors 83 which serve to lift the pods and any trash and deposit same on the oscillating separator or "scalper" 84. This scalper is driven in an oscillating motion which causes it to eject the trash from the rear end of the machine while permitting the capsules or pods to fall through the hopper discharge 85 into the horizontal lateral screw conveyor 86. The pods are thus carried laterally to one side of the frame 10 and are picked up by the elevating conveyor 87 and discharged through chute 88 into the huller generally designated 89.

The huller 89 is conventional in design and operation and is driven from the same engine which operates the hydraulic pump supplying the various hydraulic motors. This huller employs relatively rotating disks which separate the capsule segments and then break up these segments and separate them from the seeds contained therein. An air blast from a blower (not shown) ejects the broken pods or hulls through the discharge outlet 90. The castor bean seeds pass downward through the huller 89 to the collecting hopper 91 and gravitate through the chute 92 into the vertically extending bucket conveyor 93. At the upper end of the bucket conveyor 93 the castor bean seeds are thrown laterally against a deflecting plate 94 and are carried by the inclined conveyor 95 into the pivoted receptacle 96. The receptacle 96 is swung about its pivotal support 97 from time to time to discharge the castor bean seeds over the side of the frame 10 into a truck or trailer (not shown).

In operation, the self-propelled machine is driven to the field under its own power and the entrance slots 45 and 46 are aligned with two rows of castor beans. The wheels 11 and 12 travel between the rows. The plants have previously been frost-killed or artificially defoliated. One of the engines 19, 20, supplies power to the wheels 11 through the line shaft 18 and the other of the engines drives the pump which supplies fluid under pressure to the various hydraulic motors. As the machine travels forward the castor bean plants are received within the slots 45 and 46 and enter into the collector cage 25. The brushes 47 and 48 seal against the main stalks of the castor bean plants 49 to prevent escape of pods through these slots. The cage is made high enough to acocmmodate the tallest plants. As the machine moves forward relative to the plants the knocker assembly 50 violently vibrates the plants in each row, thereby causing the pods to fall from the spikes which support them. The pods are retained by the wire mesh screened walls of the cage 25 and gravitate along the inclined sections of the bottom wall into position to be picked up by the screw conveyors 66, 67, 68 and 69.

An important feature of this invention lies in the fact that the discharge openings 37 and 38 from the cage 25 have relatively great clearance height. The axles 13 do not extend across these discharge openings and therefore the upper limit of these openings is defined by the lower side of the transverse beam 10a on the frame 10. Accordingly, the machine passes over the tops of most of the plants without any tendency of parts of the machine to bend the stripped plant forward in the direction of travel. Such bending might tend to choke the discharge outlets 37 and 38 and interfere with collection of the pods and capsules being shaken from the plants. Flexible rubber gates 100 and 100a are mounted in split halves in the discharge outlets 37 and 38 respectively, to form retractable barriers. The stripped plants pass between the halves of the gates 100 and 100a deflecting the gates as they do so. These gates are resilient and tend to remain closed and serve to prevent loss of pods and capsules through the discharge openings 37 and 38, as well as to prevent re-entry of stripped plants into the discharge openings.

Since the conveyor screws 66, 67, 68 and 69 and the rotary knocker assembly 50 are separately powered, as compared to the drive to the self-propelling wheels 11, the speed of the screw conveyors and the action of the knocker assembly can be varied without changing the forward speed of the vehicle.

Figure 6:
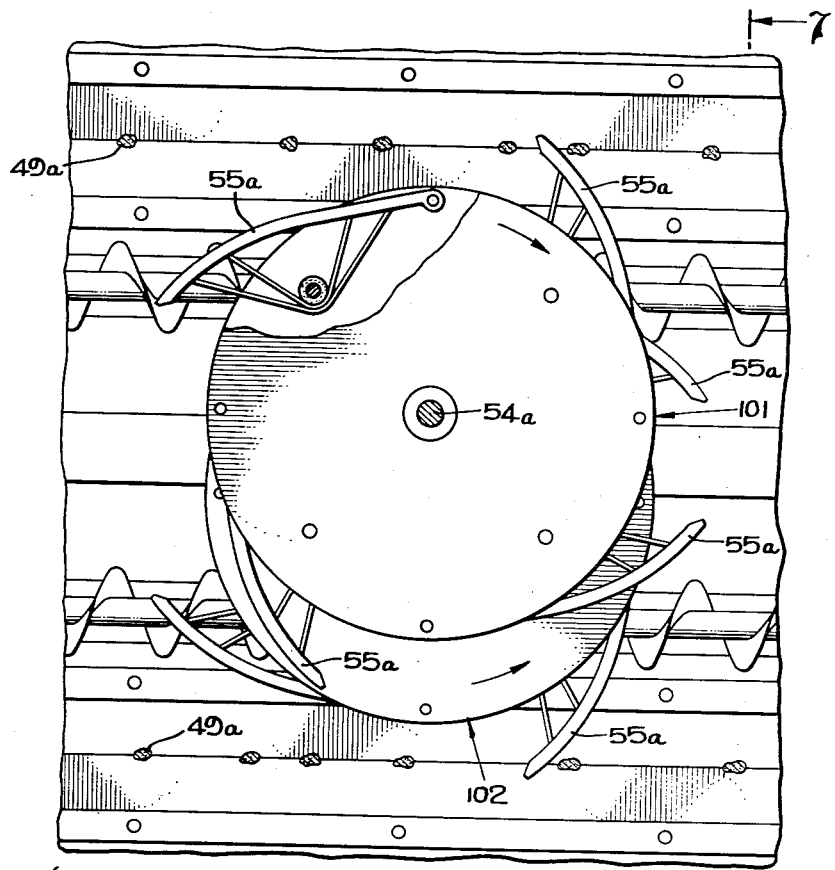
Figure 6 is a partial sectional, partial plan view similar to Figure 4 showing a modified form of rotary knocker.
Figure 7:
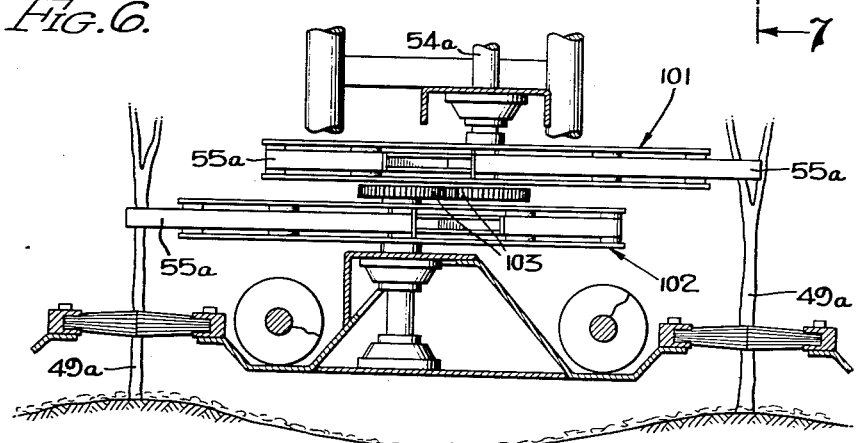
Figure 7 is a sectional elevation taken substantially on the lines 7—7 as shown in Figure 6.

In the modified form of my invention shown in Figures 6 and 7, two separate rotary knocker assemblies 101 and 102 are provided and these rotate in opposite directions. Each of these knocker assemblies is substantially the same as the knocker assembly 50 previously described and each includes a pair of circular disks having a plurality of centrifugally actuated knocker bars 55a. The vertical drive shaft 54a turns the upper knocker assembly 101, and the lower knocker assembly 102 is driven from meshing gears 103. The advantage of this modified form of double knocker assembly is that the relative motion between the knocker bars 55a and the plants 49a in each of the rows is substantially the same, whereas the knocker action on the first-described form of my invention is somewhat different on the two rows owing to the forward motion of the machine. In other respects, the modified form of my invention shown in Figures 6 and 7 operates in substantially the same manner as that previously described.

In the modified form of my invention shown in Figures 8–12, the longitudinal horizontal brushes 47a and 48a which seal against the stalks of the plants passing through the slots 45a and 46a are mounted to oscillate about the axes of their respective longitudinal supports. Each of these longitudinally extending brushes 47a and 48a has a metal holder 105 clamped with respect to pivot shafts 106, 107 by means of clamp plates 108, 109 and adjustable fastenings 110. The shafts 106 and 107 may be formed as hollow tubular members and Figure 9 shows one form of supporting bearing assembly. Shaft 106 is provided with a bushing 111 held in place by a threaded fastening 112. The bore 113 of the bushing 111 receives the stationary cylindrical pin 114. Lubricant under pressure may be supplied through the passage 115 to lubricate the bearing between the pin 114 and the bushing bore 113.

A bearing 116 is provided for the forward end of the pivot shaft 106 and a crank 117 is fixed to the end of the pivot shaft which extends forwardly of the bearing 116. The crank 117 is oscillated by means of a connecting rod 118 fixed to the eccentric 119 driven by the shaft 71a. This is the same shaft that drives the screw conveyor 66a by means of the chain 70a. From this description it will be understood that when the screw conveyor 66a is driven, the longitudinal horizontal brush 47a is caused to have oscillatory motion about the axis of the pivot shaft 106.

In a similar fashion, the longitudinal horizontal brush 48a in the slot 45a is mounted on pivot shaft 107 and is caused to oscillate by means of the crank 120, connecting rod 121 and eccentric 122. This eccentric 122 is driven from the drive shaft 80a which supplies power to both the conveyor screws 67a and 68a. It will be observed from Figures 8 and 11 that the chains 123 and 124 turn the conveyor screws 67a and 68a in opposite directions.

The pivot shaft 125 is oscillated by crank 126, connecting rod 127 and eccentric 128 from drive shaft 75a. This is the same drive shaft which drives the conveyor screws 69a by way of the chain 74a. Also, pivot shaft 129 is driven by crank 130, connecting rod 131 and eccentric 132 from shaft 80a.

The oscillating movement of the brushes 47a and 48a serves to agitate the pods or capsules which collect within the cage 25 and moves them into the paths of the conveyor screws 66a, 67a, 68a and 69a for collection at the rear of the cage 25.

Having fully described my invention, it is to be understood that I do not wish to be limited to the details herein set forth, but my invention is of the full scope of the appended claims.

I claim:

1. In a castor bean harvester, or the like, the combination of: a mobile frame, a collector cage mounted on the frame and having means forming a bottom wall thereof and at least one longitudinal slot therein to receive a row of plants to be harvested, mutually engaging bristle brushes bordering said slot and normally completely closing said slot, the bristles of said brushes being yieldable to permit passage of plant stalks but tending to maintain a seal therearound, said bristles being sufficiently stiff to support beans thereon which may fall from said plants, ground wheels on the frame behind the collector cage, and a rotary knocker within the collector cage near the bottom wall adapted to contact plants in the row sequentially as the frame and cage move forward relative to the plants.

2. In a castor bean harvester, or the like, the combination of: a mobile frame, a collector cage mounted on the frame and having means forming a bottom wall thereof and at least one longitudinal slot therein to receive a row of plants to be harvested, mutually engaging bristle brushes bordering said slot and normally completely closing said slot, the bristles of said brushes being yieldable to permit passage of plant stalks but tending to maintain a seal therearound, said bristles being sufficiently stiff to support beans thereon which may fall from said plants, a rotary knocker assembly within the collector cage near the bottom wall including a pair of flat disks, a plurality of centrifugally actuated bars pivotally mounted therebetween and adapted to swing outwardly therefrom to contact plants in the row.

3. In a castor bean harvester, or the like, the combination of: a mobile frame, a collector cage mounted on the frame and having means forming a bottom wall thereof and a pair of longitudinal slots therein to receive two rows of plants to be harvested, and a pair of rotary knocokers within the collector cage near the bottom wall, each rotary knocker being adapted to contact plants in only one of the rows, respectively, and means for turning the rotary knockers in opposite directions.

4. In a castor bean harvester, or the like, the combination of: a mobile frame, a collector cage mounted on the frame and having means forming a bottom wall thereof and a pair of longitudinal slots therein to receive two rows of plants to be harvested, and a pair of laterally offset overlapping rotary knockers within the collector cage near the bottom wall and between the rows of plants, each rotary knocker having pivoted bars adapted to swing outward by centrifugal force to engage the plants, and means for turning the rotary knockers in opposite directions.

5. In a castor bean harvester, or the like, the combination of: a mobile frame, a collector cage mounted on the frame and having means forming a bottom wall thereof and at least one longitudinal slot therein to receive a row of plants to be harvested, ground wheels on the frame behind the collector cage, and knocker means within the collector cage near the bottom wall adapted to contact plants in the row sequentially as the frame and cage move forward relative to the plants, longitudinal brushes extending into the slot from opposite sides thereof, a pair of rotary conveyor screws mounted on the bottom wall on opposite sides of the slot, drive means for turning the conveyor screws, and means driven by said drive means for oscillating the brushes about longitudinal axes.

6. In a castor bean harvester, or the like, the combination of: a mobile frame, a collector cage mounted on the frame and having means forming a bottom wall thereof and at least one longitudinal slot therein to receive a row of plants to be harvested, ground wheels on the frame behind the collector cage, and knocker means within the collector cage near the bottom wall adapted to contact plants in the row sequentially as the frame and cage move forward relative to the plants, longitudinal brushes extending into the slot from opposite sides thereof, a pair of parallel rotary conveyor screws mounted on the bottom wall on opposite sides of the slot, a driveshaft mounted on each side of the slot parallel to said conveyor screws, and means whereby each driveshaft may turn one of the conveyor screws and oscillate one of the brushes, and means driven by said drive means for oscillating the brushes about longitudinal axes.

7. A harvester for castor beans or similar crops, comprising: a mobile frame structure including elevated cross-members and laterally spaced vertical struts; ground wheels supporting said frame structure by said vertical struts; a collector cage projecting forwardly of said ground wheels and cantilever-supported from said frame structure, said collector cage having at least one entrance opening to receive a row of plants; a discharge opening having a vertical clearance above ground to said cross-members, a passageway for plants to pass through said collector cage from said entrance to said discharge opening; and bristle brushes extending into mutual engagement from opposite sides of said passageway to completely envelop the stalks of said plants, said bristles being yieldable to permit passage of said plants through said passageway, while forming a barrier to downward passage of beans dropped from said plants.

8. A harvester for castor beans or similar crops, comprising: a mobile frame structure including elevated cross-members and laterally spaced vertical struts; ground wheels supporting said frame structure by said vertical struts; a collector cage projecting forwardly of said ground wheels and cantilever-supported from said frame structure, said collector cage having at least one entrance opening to receive a row of plants; a discharge opening having a vertical clearance above ground to said cross-members, and a passageway for plants to pass through said collector cage from said entrance to said discharge opening; bristle brushes extending into mutual engagement from opposite sides of said passageway to completely envelop the stalks of said plants, said bristles being yieldable to permit passage of said plants through said passageway, while forming a barrier to downward passage of beans dropped from said plants; mechanism for agitating said plants to cause the beans to fall therefrom; and conveyors bordering said brushes to receive beans loosened from said plants.

9. A harvester for castor beans or similar crops, comprising: horizontally disposed base structures adapted for movement between rows of plants adjacent the ground, said base structures defining at least one slot for the passage of a row of plants, and collector channels bordering opposite sides of said slot; bristle brushes extending into said slot from the upper margins of said channels with their extremities in mutual engagement to form a floor completely closing said slot, said brushes being yieldable to passage of said plants along said slot, while forming a barrier to deflect the product of said plants into said channels.

References Cited in the file of this patent

UNITED STATES PATENTS

| | | |
|---|---|---|
| 1,262,559 | Pritchard | Apr. 9, 1918 |
| 1,323,089 | Neil | Nov. 25, 1919 |
| 1,629,215 | Johnson | May 17, 1927 |
| 2,362,402 | Reiter | Nov. 7, 1944 |
| 2,834,172 | Wood | May 13, 1958 |

OTHER REFERENCES

U.S. Dept. of Agriculture, A Castor Bean Harvester for Calif. ARS–42–8, February 1957.